Patented Mar. 27, 1951

2,546,330

UNITED STATES PATENT OFFICE 2,546,330

SYNTHESIS OF AROMATIC SILANE

Arthur John Barry, Midland, Lee De Pree, Holland, and Donald Eugene Hook, Midland, Mich., assignors to The Dow Chemical Company, Midland, Mich., a corporation of Delaware No Drawing. Application December 11, 1948, Serial No. 64,902

5 Claims. (Cl. 260—448.2)

This invention relates to a method of making organosilicon compounds and to certain new compounds made by the method. It is particularly concerned with the preparation of organohalosilanes having more than one hydrocarbon radical attached to the silicon atom in the molecule.

The present application is in part a continuation of our U. S. patent application Serial No. 674,926, filed June 6, 1946, now U. S. Patent No. 2,510,853.

We have found that monomethyldichlorosilane may be caused to react with an aromatic hydrocarbon to produce a poly-organohalosilane. The reaction occurs with the production of the corresponding aryl methyl silicon compound.

The reaction may be carried out over a range of temperature of from 300° to 550° C. The rate and efficiency of the reaction are dependent to a large extent upon the proximity of the molecules to be reacted. For this reason the reaction is ordinarily carried out in a closed system at a pressure above 100 pounds per square inch, and usually in the order of from 200 to 2500 pounds per square inch or higher. Employment of a pressure sufficient to liquefy a portion of the reaction mixture results in rapid reaction at a lower temperature than when the mixture is entirely in the vapor phase. The pressure may be developed autogeneously within a system or may be superimposed by means of a pump or by development of a hydrostatic pressure.

Aromatic hydrocarbons suitable for this invention comprise aromatic or mixed aliphatic-aromatic hydrocarbons. Examples of satisfactory hydrocarbon starting materials include benzene, toluene, ethylbenzene, and biphenyl.

Commercial grades of the starting materials may be employed, but impurities present in reactants of technical quality sometimes take part in side reactions which consume a portion of the organohalosilane with resultant reduction in the yield of the desired product. Because of the fact that the reaction products are hydrolyzable, it is important that the reaction be carried out under substantially anhydrous conditions. The absence of oxygen is also desirable.

The preferred mode of practicing the invention involves heating a mixture of the hydrocarbon reactant and an organohalosilane in a suitable reaction vessel, e. g. a bomb or autoclave. Usually from 0.5 to 3.0 molar equivalents of organohalosilane are employed for each molar equivalent of hydrocarbon material, although much greater or smaller proportions may be used. It is sometimes advantageous to employ a solvent, e. g. a saturated fraction of petroleum, which is substantially inert under the reaction conditions to insure mutual solution of the starting materials. Once initiated, the reaction proceeds rapidly until one of the components is substantially exhausted, as indicated by a reduction in pressure. Thereafter, the reaction products and any unreacted materials are withdrawn from the reactor and purified, e. g. by fractional distillation. Unreacted components may be returned to stock for further processing. The process may also be carried out in continuous manner, e. g. by passing a stream of the reaction mixture under pressure through a heated tubular autoclave.

The following examples illustrate certain ways in which the principle of the invention has been applied, but are not to be construed as limiting the invention:

Example 1

A mixture of 3 gram mols of benzene and 3 gram mols of methyl dichlorosilane, $CH_3SiHCl_2$, was reacted by heating in a bomb at 470° to 530° C. for 8 hours. The bomb was then cooled and the products collected and fractionally distilled. As a fraction distilling at from 102° to 103° C. at 30 millimeters absolute pressure, there was obtained phenyl methyl dichlorosilane, $C_6H_5(CH_3)SiCl_2$. Unreacted benzene and methyl dichlorosilane were also recovered.

Example 2

A mixture of 87.1 grams of diethylbenzene and 80 grams of phenyldichlorosilane was heated for 16 hours at a temperature of 375° C. in a 500 cc. bomb. There was obtained a yield of 162.1 grams of product which contained (diethylphenyl)-phenyldichlorosilane.

Example 3

A mixture of 3.09 pounds of benzene and 4.56 pounds of methyl hydrogen dichlorosilane was heated for 16 hours at a temperature of 350° C. in a bomb of 3.81 gallons capacity. A maximum pressure of 1300 pounds per square inch was obtained during the heating. A yield of 7.22 pounds of product was obtained which contained phenylmethyldichlorosilane.

Example 4

A mixture of 3.68 pounds of toluene and 4.56 pounds of methyldichlorosilane were heated in a bomb of 3.81 gallons capacity at a temperature of 375° C. for 16 hours. The product so produced contained methyltolyldichlorosilane.

*Example 5*

A mixture of 462 grams of biphenyl and 345 grams of methyldichlorosilane were heated for 16 hours at a temperature of 394° C. in a bomb of 2.4 liters capacity. A maximum pressure of 1250 pounds was developed. By fractionation there was obtained 118 grams of a material which contained principally methylbiphenyldichlorosilane. Unreacted starting materials were recovered. The methylbiphenyldichlorosilane so produced is a white crystalline material which boils at 200° C. at 30 mm. Upon hydrolysis it yields a siloxane having hydroxyl radicals linked to silicon. This was condensed with methylsilsesquioxane units to produce a copolymeric resin.

That which we claim is:

1. The process which comprises reacting a benzenoid hydrocarbon free of aliphatic unsaturation in any side chains with methyldichlorosilane at a temperature between 300° C. and 550° C. and at a pressure of at least 200 pounds per square inch and sufficient to maintain at least a portion of the reaction mixture in a liquid phase, to form an arylmethyldihalosilane as the principal reaction product.

2. The process defined in claim 1 wherein the aromatic hydrocarbon is benzene.

3. The method in accordance with claim 1 in which the aromatic hydrocarbon is toluene.

4. The method in accordance with claim 1 in which the aromatic hydrocarbon is biphenyl.

5. The process which comprises reacting a benzenoid hydrocarbon free of aliphatic unsaturation in any side chains with a compound of the group consisting of methyldichlorosilane and phenyldichlorosilane at a temperature between 300° C. and 550° C. and at a pressure of at least 200 pounds per square inch and sufficient to maintain at least a portion of the reaction mixture in a liquid phase, to form an aryldichlorosilane in which the remaining substituent on the silicon atom is of the group consisting of methyl and phenyl.

ARTHUR JOHN BARRY.
LEE DE PREE.
DONALD EUGENE HOOK.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1945 |
| 2,407,181 | Scott | Sept. 3, 1946 |
| 2,443,898 | Ellingboe | June 22, 1948 |

OTHER REFERENCES

Sommer et al.: "Jour. Am. Chem. Soc.," vol. 69 (1947), page 188.

Barry et al.: "Jour. Am. Chem. Soc.," vol. 69 (1947), page 2916.

Burkhard et al.: "Jour. Am. Chem. Soc.," vol. 69 (1947), pages 2687–89.

Pietrusza et al.: "Jour. Am. Chem. Soc.," vol. 70 (1948), pages 484–486.